United States Patent [19]

Schield

[11] 4,284,158
[45] Aug. 18, 1981

[54] DETACHABLE DIFFERENTIAL FOR VEHICLE DRIVE TRAIN

[76] Inventor: Vern L. Schield, 418 Third Ave. NE., Waverly, Iowa 50677

[21] Appl. No.: 36,383

[22] Filed: May 7, 1979

[51] Int. Cl.³ .............................................. B60K 17/00
[52] U.S. Cl. ................................................. 180/70 R
[58] Field of Search ...................... 180/75, 88, 70 R; 74/607, 710; 64/19

[56] References Cited

U.S. PATENT DOCUMENTS

| | | | |
|---|---|---|---|
| 760,628 | 5/1904 | Howe | 74/607 X |
| 782,898 | 2/1905 | Chadwick | 74/710 X |
| 1,066,954 | 7/1913 | Saunderson | 180/73 R |
| 1,327,811 | 1/1920 | Dunham | 180/70 R |
| 1,990,344 | 2/1935 | Newhouse | 180/75 |
| 2,535,762 | 12/1950 | Tapp et al. | 180/75 |
| 2,570,191 | 10/1951 | Beckwith | 74/607 X |
| 2,620,639 | 12/1952 | Burawoy | 64/19 X |

FOREIGN PATENT DOCUMENTS

26702 of 1908 United Kingdom ..................... 180/75
1400890 7/1975 United Kingdom ..................... 74/710

*Primary Examiner*—John A. Pekar
*Attorney, Agent, or Firm*—Zarley, McKee, Thomte, Voorhees & Sease

[57] ABSTRACT

The drive train of the present invention is adapted for use with a vehicle having a frame supported on forward and rearward wheels, power means on the frame, and a drive shaft driven rotatably by the power means. The drive train comprises a differential housing having an input shaft and two output shafts adapted to rotate in response to rotation of the input shaft. On the end of each output shaft of the differential is a sprocket which is registered with a second sprocket which is drivingly connected to the wheels of the vehicle. The second sprocket is spaced from but adjacent to the first sprocket, and is coupled to the first sprocket by a chain sprocket coupling which is trained around both the first and second sprockets. The differential housing includes a bolt bracket which permits bolting of the housing to the vehicle frame.

2 Claims, 3 Drawing Figures

DETACHABLE DIFFERENTIAL FOR VEHICLE DRIVE TRAIN

BACKGROUND OF THE INVENTION

This invention relates to differential housings for vehicles, and particularly to a detachable differential for a vehicle drive train.

The differential housing on the rear axle of many vehicles many times must be detached for repair or other reasons. In present devices, this is a particularly lengthy and difficult task because the differential is inextricably connected to the axle and wheels of the vehicle. Therefore, in order to disconnect the differential from the axle, it is necessary to completely disassemble the axle assembly. This is a long and difficult task.

SUMMARY OF THE INVENTION

The present invention contemplates the use of an easy disconnect coupling between the two output shafts of the differential housing and the mechanism connecting the differential to the wheels. The coupling comprises a chain trained around two sprockets which rotate on the approximate same axis and which are approximately the same size.

Therefore, a primary object of the present invention is the provision of an improved detachable differential for a vehicle drive train.

A further object of the present invention is the provision of the differential which can be removed by merely removing two chains, disconnecting the differential from the drive shaft, and unbolting the differential from the vehicle frame.

A further object of the present invention is the provision of a differential which while easily detachable provides strong, sturdy, driving connection to the wheels when secured in place.

A further object of the present invention is the provision of a device which is simple in construction, economical to manufacture, and durable in use.

On most vehicles the differential housing carries the full load. A further object of the present invention is the provision that the heavy rear axle carries the full load and can also be made into different lengths.

A further object of the present invention is the provision that the differential provides only the driving train and does not provide for any load.

A further object of the present invention is the provision of the differential which can be rotated 60 degrees around the rear axle and the input shaft remains in a horizontal position.

A further object of the present invention is the provision of the differential on the top of the rear axle which greatly increases the clearance under the vehicle.

DETAILED DESCRIPTION OF THE INVENTION

Figure 1:
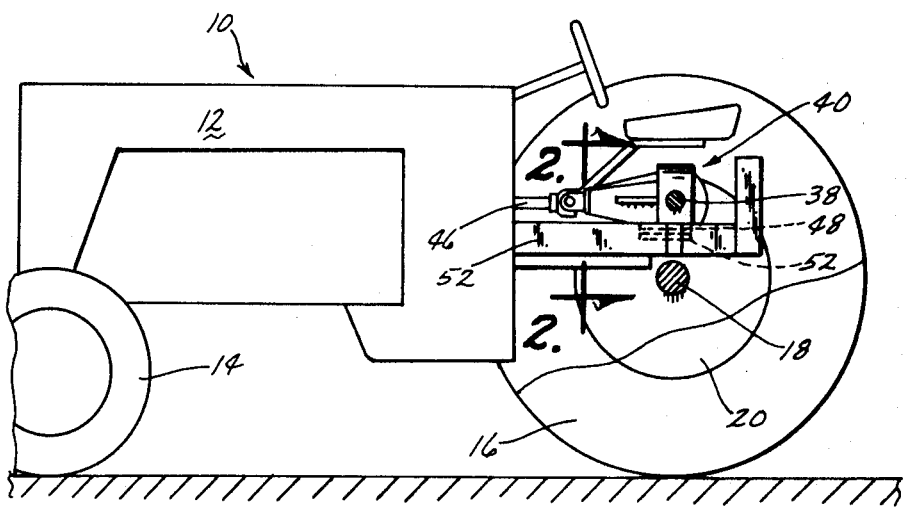
FIG. 1 is an elevational view of a farm tractor in which the differential of the present invention is installed.

The numeral 10 generally designates a tractor having a tractor body 12, forward wheels 14 and rearward wheels 16. Rearward wheels 16 are mounted on an axle 19. Each wheel includes a hub 20 which is fixed to a collar 22 rotatably mounted on axle 19. Collar 22 has fixed thereto a gear 24 which is in meshing engagement with a second gear 26. Vehicle 10 includes side frames 28 through which an axle sheath 18 extends.

Second gears 26 are each mounted on a stub shaft 33 which is rotatably journaled in a collar 32. Collars 32 are fixed to side frames 28 in spaced relation above axle 19.

Mounted on the inner end of stub shaft 33 is a stub shaft sprocket 34.

A pair of differential sprockets 36 are each fixed to a rotating output shaft 38 extending from a differential housing 40. Housing 40 includes an input shaft 42 having a clevis 44 adapted to be connected to a drive shaft 46 from the vehicle engine (not shown). Rotation of input shaft 42 causes output shafts 38 to rotate.

Adjacent the lower end of differential housing 40 is a mounting flange 48 adapted to fit against and be bolted to a pair of mounting ears 50 which are fixed to the longitudinal frame members 52 of vehicle 10. Bolts 54 detachably secure flange 48 to ears 50.

Differential sprockets 36 and stub shaft sprockets 34 are each spaced in registered alignment with one another. Each sprocket pair 34, 36 is coupled together by means of a coupling chain 56 which has an axial width equal to or slightly greater than the combined axial widths of each sprocket pair 34, 36. Chain 56 includes a removable link 58 which permits the chain to be detached from sprocket pair 34, 36 to disconnect sprocket 34 from sprocket 36.

In operation when coupling chains 56 couple each sprocket pair 34, 36 together, the engine drive shaft 46 provides driving force to wheels 16. The train of drive proceeds from drive shaft 46 through input shaft 42 to output shafts 38. The connection of sprockets 34, 36 causes the rotation of shafts 38 to be imparted to stub shafts 33. Rotation of shafts 33 causes gears 24, 26 to transfer this rotational movement to wheel hubs 20, thereby causing wheels 16 to rotate.

When removal of differential housing 40 is necessary for repair or other reasons, the device may be quickly and easily detached from the vehicle. Detachment requires only disconnecting the drive shaft 46 from yoke 44, then removal of chains 56 to disconnect sprockets 36 from sprockets 34, and finally, the disconnection of flange 48 from ears 50 by removal of bolts 54. These three quick disconnecting operations permit the removal of the differential from the vehicle.

Figure 2:
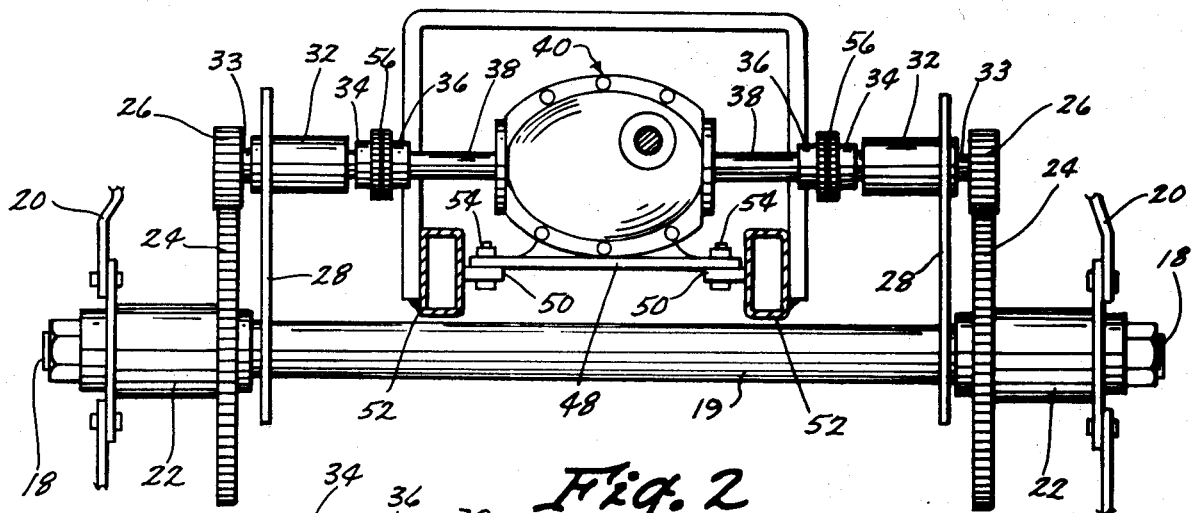
FIG. 2 is a sectional view taken along line 2—2 of FIG. 1.
Figure 3:
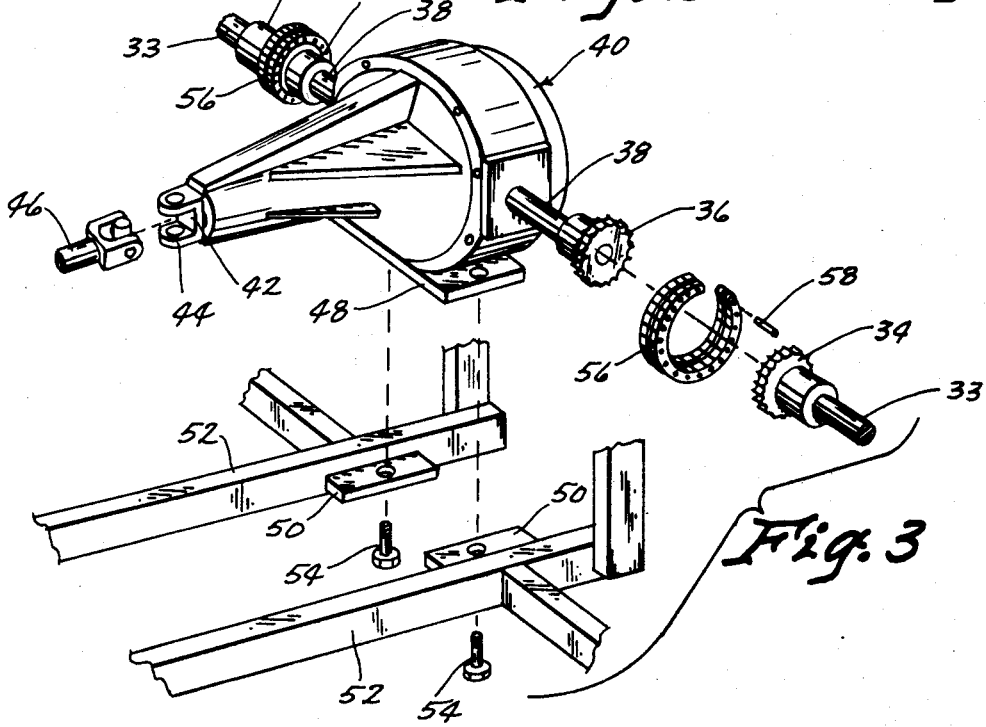
FIG. 3 is an exploded perspective detailed view of the mounting of the differential on the vehicle frame.

Because of the drive train described herein, axles 19 of different lengths can be used. One wheel can be offset from the tractor frame a different distance than the other wheel for a given operation. The differential housing is relieved of the full load. Further, if space requirements dictate, the differential housing of FIG. 2 could be oriented within a 60° angle about the rear axle and still have operative connection through a suitable input shaft 46 and universal joint.

Thus, it can be seen that the device accomplishes at least all of its stated objectives.

What is claimed is:

1. A drive train for a vehicle having a frame supported on forward and rearward wheels, a power means on said frame, and a drive shaft driven rotatably by said power means, said drive train comprising:

a differential housing having an input shaft and two output shafts adapted to rotate in response to rotation of said input shaft, first coupling means on said input shaft for detachably coupling said input shaft to said drive shaft, a first and second connecting sprocket means on said output shafts of said differential housing, a third and fourth rotatable sprocket member each positioned adjacent one of said first and second connecting sprocket means, respectively, and which rotate about an axis approximately coincident with the rotational axes of said first and second sprocket means; said third and fourth sprocket members being approximately the same size as said first and second sprocket means, the outer peripheral edges of said first and second sprocket means being adjacent and in registered alignment with the outer peripheral edges of said third and fourth sprocket members, respectively, second and third coupling means each detachably coupling said first and second sprocket means to third and fourth sprocket members, respectively; said second and third coupling means each comprising a single chain trained over said registered pairs of first and third sprockets, and second and fourth sprockets; each said chain comprising a plurality of links joined into a continuous loop, one of said links being detachable to permit removal of said loop from said sprockets, a mechanism interconnecting each of said third and fourth sprocket members to one of said rearward wheels for causing rotation of said rearward wheels in response to rotation of said third and fourth sprocket members, said forward and rearward wheels being supported on axle means, said wheels and axle means bearing the weight of said vehicle, a securing means detachably securing said differential housing to said frame at a location above and remote from the location of said axle means for said rearward wheels.

2. A drive train according to claim 1 wherein said mechanism interconnecting said third and fourth sprocket members to said rearward wheels comprises a pair of stub shafts rotatably mounted to said frame and each fixed to one of said third and fourth sprocket members, a first gear being fixed to said stub shaft and at least one additional gear being in driven meshing engagement with said first gear.

* * * * *